Jan. 3, 1928.
J. R. OISHEI
1,654,751
ADJUSTABLE SUPPORTER OR BRACKET
Filed July 12, 1922
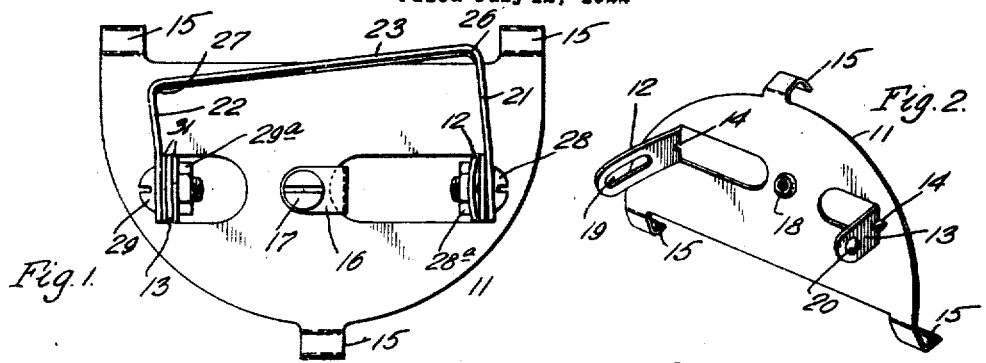
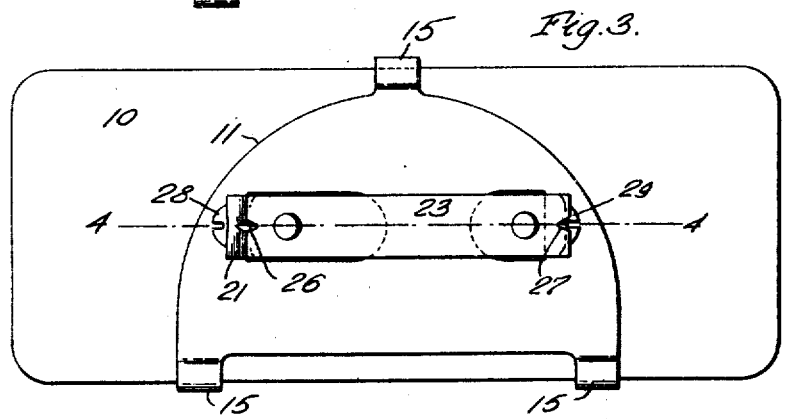
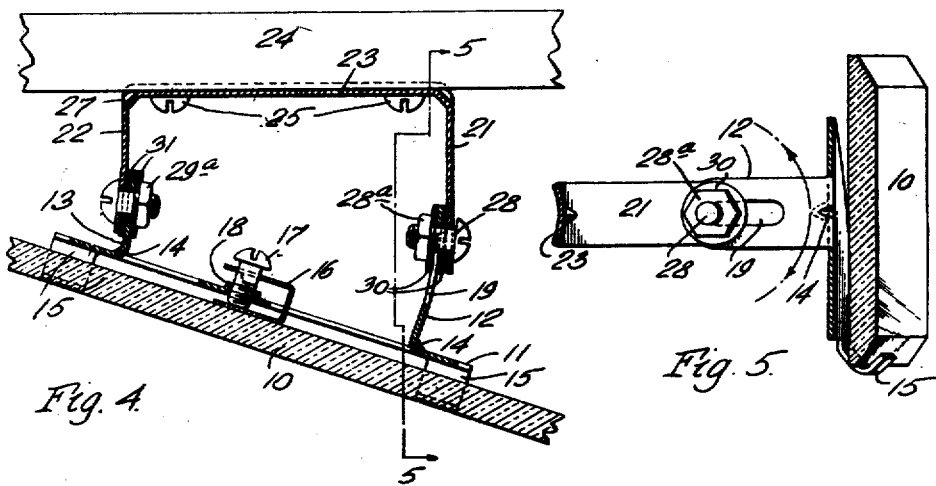
INVENTOR.
John R. Oishei
by Parker & Buchanan
ATTORNEYS.

Patented Jan. 3, 1928.

1,654,751

UNITED STATES PATENT OFFICE.

JOHN R. OISHEI, OF BUFFALO, NEW YORK, ASSIGNOR TO TRICO PRODUCTS CORPORATION, OF BUFFALO, NEW YORK.

ADJUSTABLE SUPPORTER OR BRACKET.

Application filed July 12, 1922. Serial No. 574,356.

This invention relates to improvements in adjustable supports or brackets of the kind used for mounting mirrors on automobiles or vehicles in position to enable the driver to readily see objects in rear of him. Mirrors of this type are usually located above or adjacent to the upper edge of the windshield or front window of the vehicle, where they are inconspicuous and not unsightly when seen through the front window, and should be adjustable so that the mirror glass can be set at the necessary angle horizontally or vertically, depending upon the location of the mirror in the vehicle and according to the requirements of the driver, in order to enable the driver to see the road or objects in the desired rearward direction.

The objects of this invention are to provide an adjustable mirror support or bracket which may be readily attached to a windshield or part of the vehicle; also to provide a mirror bracket which is relatively inexpensive to manufacture, and the parts of which may be readily stamped from sheet metal or the like; also to provide a mirror bracket consisting of few parts and of relatively light weight, but which is so constructed as to hold the mirror glass rigid and prevent excessive vibration thereof; and also to provide improvements in mirror supports and brackets in the other respects hereinafter described and claimed.

In the accompanying drawings:

Fig. 1 is a rear elevation of a mirror support or bracket embodying the invention, showing the bracket folded to permit attachment to the vehicle or for shipping.

Fig. 2 is a perspective view of the mirror holder plate thereof.

Fig. 3 is a rear elevation of the bracket with a mirror secured thereto.

Fig. 4 is a sectional plan view of the mirror bracket and a portion of the mirror, on line 4—4, Fig. 3.

Fig. 5 is a section on line 5—5, Fig. 4.

Referring to the drawings, the support or bracket of this invention includes a holder plate on or to which the mirror is secured and means connecting the holder plate to a windshield frame or a part of a vehicle while permitting angular movement of the mirror when desired. In the embodiment of the invention illustrated, 10 designates a mirror glass or other reflecting surface, which is mounted on a holder plate generally designated as 11. The holder plate 11 may be of any suitable shape and preferably consists of a substantially flat plate of thin sheet metal or the like provided with angularly or rearwardly extending ears 12 and 13, the former of which is shown as being curved about an axis adjacent the ear 13. As illustrated in the drawings, it is preferred that these ears 12 and 13 be formed integral with the plate 11 and this may be readily accomplished by stamping the ears 12 and 13 out of the material of the plate 11, preferably intermediate of the ends thereof. In this manner the holder plate and its integral ears may be readily formed in a minimum number of stamping operations and the ears being integral with the plate, no separate operation is required to connect them to the plate. In order to maintain the ears 12 and 13 at the desired angle to the holder plate, and to ensure their rigidity with the plate, the metal of the plate and ears is embossed or punched out as at 14 at the bend between the ears and the plate. This provides a buttress or reinforcement for the ears at the point where they join the plate and results in a relatively high degree of rigidity of the ears even though the plate may be formed of a light weight sheet metal. The holder plate 11 is preferably provided with bent tongues or fingers 15 which grip the edges of the mirror and the mirror is preferably maintained in place by suitable means, as for example, the bearing member 16 which presses the mirror firmly against the fingers 15. The bearing member 16 preferably extends through one of the holes in the holder plate formed by the stamping out of the ears and is forced against the back of the mirror by means of a screw 17 threaded through an opening 18 in the holder plate. The three tongues 15 provide a three-point support for the mirror, said tongues being substantially equidistant from the single bearing member so that the mirror is pressed uniformly against each of the tongues by the single cooperating clamping or bearing member. The aperture, left by striking out the longer ear 12, extends to a point in proximity to the middle portion of the holder plate so that the bearing member, when passed through the aperture, will be substantially central of the holder plate.

The ears 12 and 13 are provided with suitable means whereby the holder plate may have the necessary pivotal or sliding movement on the member to which it is attached to effect the desired angular adjustment of the mirror. In the embodiment shown, the ear 12 is provided with a slot 19 and the ear 13 has a hole 20 therethrough. The projecting ears of the holder plate are adapted to be pivotally connected to an attaching device, which device preferably has for this purpose forwardly extending arms for pivotally cooperating with the respective ears. In the preferred form shown, the attaching device consists of a one-piece member comprising arms 21 and 22 connected by a suitable web 23. This attaching device is preferably formed of a strip of sheet metal bent at its ends to provide the arms 21 and 22, the web 23 thereof being connected to the windshield frame or part 24 of a vehicle by suitable means, as, for example, the screws 25 shown in Fig. 4. The metal strip from which the attaching device is formed is preferably embossed or punched out at the bend between the web and the arms, as indicated at 26 and 27, for the purpose of making the arms more rigid with the web and preventing their distortion when in use. As illustrated in the drawings, the arm 21 is preferably of greater length than the arm 22 but short enough to permit the attaching device to be folded over against the holder plate and not project beyond the edges of the holder plate, as illustrated in Fig. 1, thereby making a small and very compact package for shipping. The arms 21 and 22 are preferably formed with suitable holes in their ends to accommodate the pivot bolts or screws 28 and 29 which extend through the slot in the ear 12 and the hole in ear 13 respectively, as illustrated. These bolts or screws are each provided with a locking nut 28ª and 29ª respectively, as illustrated, so that by tightening the nuts, the holder plate may be secured in any desired position. 30 and 31 designate pairs of friction washers on the bolts 28 and 29 and interposed between the parts of the ears and arms bearing on these bolts.

With the construction described and illustrated, the mirror may be swung in a vertical plane and may also, by reason of the provision of slot 19 in ear 12, be moved horizontally and angularly with respect to the support to which it is attached, so that the desired rearward view may be obtained by the driver of the vehicle. The device may be readily attached to a windshield frame or another part of the vehicle. The device is inexpensive to manufacture and assemble, consisting as it does of only two parts which may be readily stamped from suitable sheet metal. It may be constructed of very light material, and the integral construction of the projecting ears of the holder plate and of the attaching device with its reinforced arms, provides a most rigid and stable mounting for the mirror. The device is compact and small and occupies very small space in shipping.

I claim as my invention:

1. A supporting bracket for mirrors, comprising a holder plate of sheet metal arranged in spaced relation to the back of a mirror, said holder plate having three non-alined tongues adapted to engage about the edge of a supported mirror at three non-alined points to constitute the sole support therefor, said tongues extending about the mirror edge and engaging over the front portion of the supported mirror, and a single bearing member mounted on the holder plate behind the mirror and adjustably engageable with the supported mirror at a point substantially centrally between the three tongues whereby substantially uniform pressure will be brought to bear by all of the three tongues on the supported mirror, said single bearing member cooperating with said tongues to clamp a supported mirror to the bracket.

2. An adjustable supporting device for mirrors for vehicles, comprising a holder plate of sheet metal arranged in spaced relation to the back of a mirror, said holder plate having a pair of spaced tongues gripping one edge portion of the mirror, and a single tongue gripping the other edge portion thereof at a point substantially equidistant from the tongues of said pair, and a single bearing member adjustably mounted on said holder plate to adjustably press against the rear face of said mirror to hold said tongues in adjustable engagement with said mirror.

3. An adjustable supporting device for mirrors for vehicles, comprising a sheet metal holder plate having a pair of mounting ears struck out therefrom and leaving apertures therein, spaced tongues on the plate for engaging around the edge portions of a supported mirror, a bearing member engaged in one of the plate apertures and having a part underlying the plate at a point substantially equi-distant from the tongues, and a clamping screw threaded through the plate and pressing said bearing member part against a supported mirror to clamp the latter against the tongues.

4. A supporting bracket for mirrors, comprising in its entirety, a holder plate having a plurality of non-alined and integrally connected gripping tongues engaging from behind and about the edge portions of a supported mirror to overhang the front face thereof, means for mounting the holder plate, and a single adjustable bearing member mounted on the holder plate for adjustably impinging against the rear side of a supported mirror at a point substantially equidistant from said overhanging tongues to press the mirror adjustably uniformly against said tongues and thereby cooperate with the latter in clampingly supporting a mirror.

JOHN R. OISHEI.

nected gripping tongues engaging from behind and about the edge portions of a supported mirror to overhang the front face thereof, means for mounting the holder plate, and a single adjustable bearing member mounted on the holder plate for adjustably impinging against the rear side of a supported mirror at a point substantially equidistant from said overhanging tongues to press the mirror adjustably uniformly against said tongues and thereby cooperate with the latter in clampingly supporting a mirror.

JOHN R. OISHEI.

CERTIFICATE OF CORRECTION

Patent No. 1,654,751.   Granted January 3, 1928, to

JOHN R. OISHEI.

It is hereby certified that error appears in the printed specification of the above numbered patent requiring correction as follows: Page 2, line 98, claim 1, for the article "a" read "the"; page 3, line 10, claim 4, after the word "adjustably" insert the word "and"; and that the said Letters Patent should be read with these corrections therein that the same may conform to the record of the case in the Patent Office.

Signed and sealed this 14th day of February, A. D. 1928.

Seal.

M. J. Moore,
Acting Commissioner of Patents.

CERTIFICATE OF CORRECTION

Patent No. 1,654,751.                              Granted January 3, 1928, to

JOHN R. OISHEI.

It is hereby certified that error appears in the printed specification of the above numbered patent requiring correction as follows: Page 2, line 98, claim 1, for the article "a" read "the"; page 3, line 10, claim 4, after the word "adjustably" insert the word "and"; and that the said Letters Patent should be read with these corrections therein that the same may conform to the record of the case in the Patent Office.

Signed and sealed this 14th day of February, A. D. 1928.

Seal.

M. J. Moore,
Acting Commissioner of Patents.